(12) United States Patent
Little et al.

(10) Patent No.: US 7,363,164 B2
(45) Date of Patent: Apr. 22, 2008

(54) METHOD OF EVALUATING FLUID SATURATION CHARACTERISTICS IN A GEOLOGICAL FORMATION

(75) Inventors: Jeff Little, Bakersfield, CA (US); Jack LaVigne, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 77 days.

(21) Appl. No.: 11/244,552

(22) Filed: Oct. 6, 2005

(65) Prior Publication Data

US 2006/0136135 A1    Jun. 22, 2006

Related U.S. Application Data

(60) Provisional application No. 60/637,680, filed on Dec. 20, 2004.

(51) Int. Cl.
*G01V 3/18* (2006.01)

(52) U.S. Cl. ..................................... 702/13

(58) Field of Classification Search ............ 702/7, 702/11–13
See application file for complete search history.

(56) References Cited

U.S. PATENT DOCUMENTS

| | | | |
|---|---|---|---|
| 5,770,945 | A | 6/1998 | Constable |
| 6,470,274 | B1 | 10/2002 | Mollison |
| 6,842,006 | B2 | 1/2005 | Conti |

OTHER PUBLICATIONS

Archie, G.E., "The Electrical Resistivity Log as an Aid in Determining Some Reservoir Characteristics", Transactions AIME, 146 (1942), pp. 54-62.
Clavier et al., "The Theoretical and Experimental Bases for the 'Dual Water' Model for the Interpretation of Shaly Sands", SPE 6859, 1977, pp. 3-18.
Kurniawon, Fnu, "Evaluation of the Hydrocarbon Potential in Low-Salinity Shaly Sand." Louisiana State University, Masters' Thesis; Apr. 4, 2002).
Waxman, et al, "Electrical Conductivities in Shaly Sands—I. The Relation Between Hydrocarbon Saturation and Resistivity Index; II. The Temperature Coefficient of Electrical Conductivity", SPE 4094, 1974, pp. 213-225.

*Primary Examiner*—Donald E McElheny, Jr.
(74) *Attorney, Agent, or Firm*—Bryan L. White; Jonna Flores; Kevin P. McEnaney (57) ABSTRACT

Various methods are disclosed for evaluating water saturation characteristics in a geological formation penetrated by a borehole, including injection fluid introduced into the formation by an external injection process performed upon the formation. In various embodiments, the total water saturation may be obtained from the relationship provided by the Triple Water Equation, and used to map saturation in the formation and making drilling decisions.

24 Claims, 4 Drawing Sheets

METHOD OF EVALUATING FLUID SATURATION CHARACTERISTICS IN A GEOLOGICAL FORMATION

CROSS REFERENCE TO RELATED APPLICATIONS

This application claims priority, under 35 U.S.C. § 119, to Provisional Application Ser. No. 60/637,680, filed Dec. 20, 2004, incorporated by reference in its entirety.

BACKGROUND

1. Field of the Invention

The present invention relates generally to geological formation evaluation techniques. The invention further relates to the interpretation of electrical resistivity measurements to evaluate fluid content. More particularly, the present invention relates to the evaluation of water and hydrocarbon saturation in shaly-sand formation and other formations from resistivity and porosity values.

2. Background

A common method for evaluating the hydrocarbon content of reservoirs entails the use of electrical resistivity measurements. In accordance with known interpretation techniques, one or more types of porosity-related measurements is combined with measurements of electrical resistivity, R (or its inverse, electrical conductivity, C) to infer the character of the fluid content within the pore spaces of the formation. The fractional volumes of connate water and hydrocarbons in the formation may be obtained from empirical relationships between total formation resistivity $R_t$ and porosity and connate water resistivity. One such relationship, called the "Archie relationship" or "Archie Equation" is universally applied in fluid reservoir calculations to obtain an estimate of water saturation from wireline logs in shale-free formations. See e.g. Archie, "The Electrical Resistivity Log as an Aid in Determining Some Reservoir Characteristics", Transactions AIME, 146 (1942), p. 54-62.

The Archie equation provides an estimate of total water saturation $S_w$ by combining reservoir properties of porosity, water conductivity, and total conductivity along with parameters a, m, and n. This relationship is generally used to evaluate the fractional volume, $S_w$, of porosity that is filled with formation water. The potential of a zone in the formation to produce hydrocarbons is often measured in terms of water saturation, $S_w$. Given this fractional volume, the remaining fractional amount $S_o$ is assumed to be occupied by hydrocarbons.

In the Archie relationship, water saturation $S_w$ is provided by the following expression:

$$S_w^n = \frac{R_0}{R_t} = \frac{1}{R_t} \cdot \frac{aR_w}{\Phi^m} \quad (1)$$

or as:

$$S_w^n = \frac{C_t}{\Phi^m \cdot C_w} \quad (2)$$

where, $S_w$=formation water saturation, fraction,
$C_t$=rock conductivity, mho/m,
$C_w$=brine conductivity, mho/m,
$R_w$=resistivity of formation water, ohm-m,
$R_t$=resistivity of formation rock, ohm-m,
$\Phi$=porosity, fraction,
n=saturation exponent, and
m=cementation exponent.

The constants n and m are empirically determined values that relate porosity (represented by $\Phi$) to resistivity, $R_o$, of porous rock formation that is completely saturated with water, $R_o$. The values for n and m are typically estimated from core data analysis or are known through past experience with the formation in question. The formation resistivity, $R_w$, represents the resistivity of the formation water disposed in the pore spaces of the formation. Formation water resistivity may be obtained from field measurements and/or log analysis estimation. On the other hand, values for formation rock resistivity $R_t$ is typically obtained from deep resistivity log readings. Porosity values may be estimated from porosity logs such as density, neutron or sonic logs.

The accuracy of estimates of total water saturation derived from the Archie Equation begins to fall, when the estimate is applied for a shaly-sand formation. Shaly-sand formation includes clay minerals and clay components that retain water. This highly conductive water increases the value of the conductivity measurements, while decreasing the resistivity measurements. The Archie equation assumes, however, that the formation water is the only source of conductivity in the formation. If uncorrected resistivity values are used in the Archie equation and other conventional calculations, an overestimation of water saturation results and the presence of hydrocarbon content may be overlooked.

Accordingly, expansions of the Archie equation have been developed to account for the conductivity effect of water associated with clay minerals and components in shale, thereby providing a more accurate evaluation of water saturation. The "dual water equation" or "dual water method", and similar models, were introduced for this purpose (see, e.g., Clavier et al., "The Theory and Experimental Bases for the 'Dual Water' Model of the Interpretation of Shaly Sands", SPE 6859, 1977, pp. 3-18 (hereby incorporated by reference for all purposes and made a part of the present disclosure)).

The Dual Water Models take into account an ionic double-layer in the clay components of shaly sand stones. According to this model, clay platelets are negatively charged as the result of ion substitutions in the lattice and broken bonds at the edge. Sodium cations (Na+) are held in suspension close to the clay surface when the clay is in contact with saline solution and act as charge-balancing cations. As a result, Cl-anions in the saline solution are repelled from the clay surface. Further, a mono-layer of adsorbed water forms on the clay surface and is joined by a layer of hydrated Na+ ions. This layer acts to further balance the negative charge of the clay platelets. Measured in terms of cation exchange capacity (CEC), the concentration of Na+ ions provide an additional source of conductivity.

Following the above observation, Waxman and Smits proposed an empirically-derived saturation-resistivity relationship to calculate the fractional volume of pore space capable of holding producible hydrocarbons. This relationship assumes that cation conduction and the conduction of normal sodium chloride act independently in the pore space, resulting in parallel conduction paths. See e.g., M. H. Waxman, et al. "Electrical Conductivities in Oil Bearing Shale Sands," SPE Journal, vol. 8, no. 2, Society of Petroleum Engineers, (1968). This model can be expressed by the following Waxman-Smits equation:

$$C_t = \frac{S_w^n \cdot Cw}{F^*} + \frac{B \cdot Q_v \cdot S_w^{n-1}}{F^*} \quad (3)$$

where,
- $C_t$=rock conductivity,
- $S_w$=water saturation,
- n=saturation exponent for shaly formations,
- B=equivalent conductance of clay counterions,
- $Q_v$=cation exchange capacity per unit pore volume,
- $C_w$=water conductivity, and
- $F^*$=formation factor of the interconnected porosity.

Under the Waxman-Smits model, an assumption is made that shaly formation behaves like a clean, shale-free formation of the same porosity, tortuosity, and fluid saturation, except that the water appears to be more conductive than its bulk salinity. The increase of apparent water conductivity is dependent on the presence of counter-ion.

The Dual Water equation modifies the Waxman-Smits equation by taking into account the exclusion of anions from the double-layer. (See e.g., Kurniawon, Fnu, "Evaluation of the Hydrocarbon Potential in Low-Salinity Shaly Sand." Louisiana State University, Masters' Thesis; Apr. 4, 2002). The Dual Water model represents the counterion conductivity restricted to the clay bound water, where counterion reside, and to the free water, which is found at a distance away from the clay surface. Id. This model provides that apparent water conductivity depends on the relative volumes of clay bound water and free water. The dual water model correctly assumes that irreducible water and free or mobile water have the same conductivity and considers the two volumes together as a single volume.

In the dual water equation, water saturation $S_w$ is expressed as follows:

$$Sw = swb \cdot \frac{(cwf - cbw)}{2 \cdot cwf} + \left[ \frac{\sqrt{4\, cudc \cdot cwf \cdot phit^{nDwa} + ((cwf - cbw) + swb \cdot phit^{nDwa})^2}}{2\, cwf \cdot phit^{nDwa}} \right] \quad (4)$$

where,
- $S_{wb}$=fractional portion of total porosity saturated with clay bound water,
- $C_{wf}$=conductivity of freely moving water,
- $C_{bw}$=conductivity of clay bound water,
- cudc=deep conductivity,
- phit=total porosity, and
- m $D_{wa}$=cementation exponent.

BRIEF SUMMARY OF THE INVENTION

In one aspect of the present invention, a method of evaluating water saturation characteristics is provided. The method is applicable to a geological formation penetrated by a borehole and including injection fluid introduced into the formation by an external process performed upon the borehole (e.g., EOR processes). The method entails conducting electromagnetic induction measurements indicative of resistivity values of the formation. A value of total porosity for the formation is also obtained. The method then calls for defining fractional volumes for each of clay bound water, free water, and irreducible water in the formation, wherein the free water volume accounts for injection fluid introduced into the formation. The method also calls for defining values of conductivity for each of the clay bound water, the free water, and the irreducible water. Finally, water saturation in the formation is determined from a relationship that combines values for total porosity and conductivity of the formation and values for conductivity and fractional volumes for each of the clay bound water, free water, and the irreducible water. This relationship is preferably provided by an equation referred to herein as the Triple Water Equation.

In another aspect of the present invention, a method is provided for evaluating differential saturation levels in a reservoir. The differential saturation levels are determined from an initial state of production to a later state of production that exists after performance of an external fluid injection process (e.g., water flood process), whereby new injection fluid is introduced into a reference region of the reservoir. The inventive method entails conducting electrical resistivity measurements at a reference region in a reservoir during the initial state and then, deriving from the electrical resistivity measurements, a evaluation of initial total water saturation at the reference region. Further, a fluid injection process is performed on the reservoir, whereby injection fluid is introduced into the reference region of the reservoir. Moving to the later state (e.g., four years later), a second set of electrical resistivity measurements is conducted at the reference region. From the second electrical resistivity measurements, an evaluation of later total water saturation of the reference region is derived. The total water saturation is obtained from a relationship accounting for fractional volumes of each of irreducible water, free water, and clay-bound water (e.g., employing the Triple Water Equation). In this relationship, the free water is considered to have conductive properties different from that of the irreducible water and the clay-bound water. Then, the later total water saturation is compared with the initial total water saturation. In this way, the differential water saturation at the reference region is evaluated between the initial state and the later state.

BRIEF DESCRIPTION OF THE DRAWINGS

The present invention will be described in connection with the attached drawings which explain various aspects of the invention. In particular.

DETAILED DESCRIPTION

In one aspect of the present invention, a mathematical or petrophysical model is utilized to evaluate, more accurately than the "dual water" model and other prior art models, total water saturation in certain formations. The inventive method is particularly suited for evaluating water saturation levels in shaly-sand formations and other formations into which an external fluid has been introduced. In various embodiments of the invention, the water saturation levels are evaluated from electromagnetic tomography measurements combined with porosity values.

Figure 1:
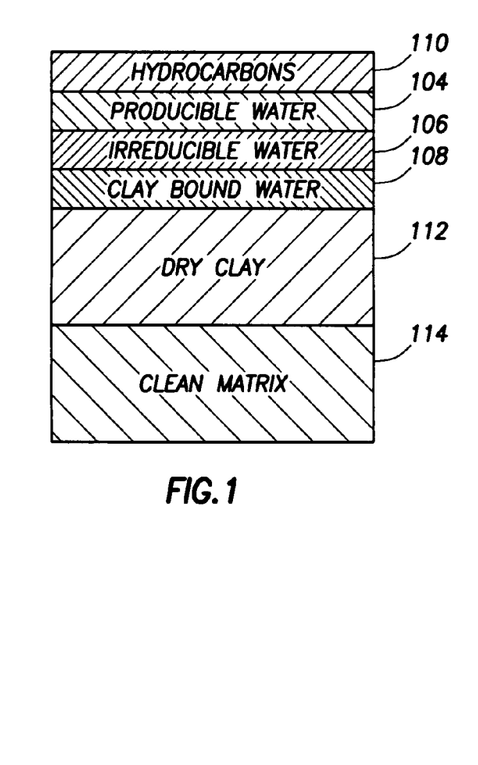
FIG. 1 is a diagrammatical representation of the volume components of an exemplary section of a reservoir.

FIG. 1 depicts a diagrammatical representation or model 100 of the fractional volume components of a shale-sand region of a formation (or reservoir). The simplified diagram 100 provides that the liquid fraction of the formation includes three sources of water. These sources include a volume of each of free water 104, irreducible water 106, and clay bound water 108. As used herein, the term "free water" may be replaced with the terms "producible water", "freely moving", "mobile water" or "formation water". The fluid volume or pore space is also occupied by a fractional volume of hydrocarbon 110, the characterization of which is the ultimate objective of the evaluation techniques described herein. Further, the formation sample includes solid volumes of dry clay 112 and clean matrix 114. Reference may be made to the diagrammatical representation 100 throughout this Detailed Description to help describe the treatment of the different water sources under the inventive evaluation techniques.

Under the dual water model, the free water and the irreducible water volumes are correctly considered to have the same conductivity. Thus, these two water sources are treated as components of a single volume of water for purposes of evaluating water saturation. In certain reservoirs and under certain reservoir conditions, this assumption does not hold true. In particular, Applicants have discovered that the accuracy of the dual water model and similar prior art models is compromised when applied to shaly-sand reservoirs wherein a new, highly conductive fluid has been introduced. Such a fluid may be introduced, for example, by an enhanced oil recovery (EOR) processor from drilling operations effecting invasion of drilling fluid into the formation. The present invention is particularly suited to evaluating water saturation in such a reservoir and under such reservoir conditions. In one aspect of the inventive evaluation method, the fractional volumes of the three water sources are considered separately and considered to have different, independent electrical properties (i.e., electrical conductivity) for purposes of evaluating fluid content.

For purposes of the present description, the subject formation or reservoir and/or borehole may be referred to as being in an initial state prior to introduction of these new fluids and then, in a later state at which these fluids have already been introduced into a region or section of the reservoir. In the alternative, operations performed upon the formation may be characterized as pre-injection (before fluid introduction) or as post-injection (after fluid introduction). In the later state, water contained in the reservoir comes in not two, but three distinct types: 1) fluid associated with clay (clay bound water); 2) water that is free to move about the reservoir, or free or mobile water; and 3) irreducible water that is bound between the sand grains. In a further aspect of the invention, the evaluation method recognizes that the conductivity of the free or mobile water is no longer the same as that of the irreducible water (having been altered, in both volume and properties by the injection of the new fluids).

The state of a formation after an EOR process (i.e., post-injection) provides a particularly suitable application of the inventive method. Accordingly, throughout the present description, reference will be made to conditions associated with post-injection processes. The application of EOR water floods requires, for example, that operators inject into the reservoir, water from some external source. This injection water is different from the water residing originally in the formation and is characterized by electrical properties different from that of the irreducible water. Thus, the dual water assumption (that the irreducible water and the free or mobile water have the same conductivity) cannot be made without sacrificing accuracy.

As discussed above, the present evaluation methods and techniques are particularly suited for application to a certain formation and certain formation or reservoir conditions. The formation can be any such formation that contains the three aforementioned water sources. To facilitate the present Description, the subject formation may be described herein simply as shale or shaly-sand formation. It should be understood, however, that although such formation types may be the most applicable, the inventive method may be applied in respect to other formations having an additional fluid source. The Detail Description's use of the terms "shaly" or "shale-sand" should, therefore, not be construed as limiting the invention specifically to that formation type.

The Triple Water Equation

The introduction of at least a third conductive fluid requires a new methodology to more accurately quantify the water and hydrocarbon contents in the reservoir. A preferred methodology, according to the invention may be referred to as the "triple water model" or "triple water equation." The triple water equation provides for total water saturation, $S_w$ using the following relationship or expression:

$$Sw = \frac{swb \cdot (cwf - cbw) + swi \cdot (cwf - cwi)}{2 \cdot cwf} + \left[ \frac{\sqrt{4\,cudc \cdot cwf \cdot phit^{nDwa} + ((swb \cdot (cwf - cbw) + swi \cdot (cwf - cwi))phit^{nDwa})^2}}{2 \cdot cwf \cdot phit^{nDwa}} \right] \quad (5)$$

where,
$S_{wb}$=fractional portion of total porosity saturated with clay bound water,
$S_{wi}$=irreducible water saturation,
$C_{wf}$=conductivity of freely moving water,
$C_{bw}$=conductivity of clay bound water,
$C_{wi}$=conductivity of irreducible water,
cudc=deep conductivity,
phit=total porosity, and
mDwa=cementation exponent.

Figure 2:
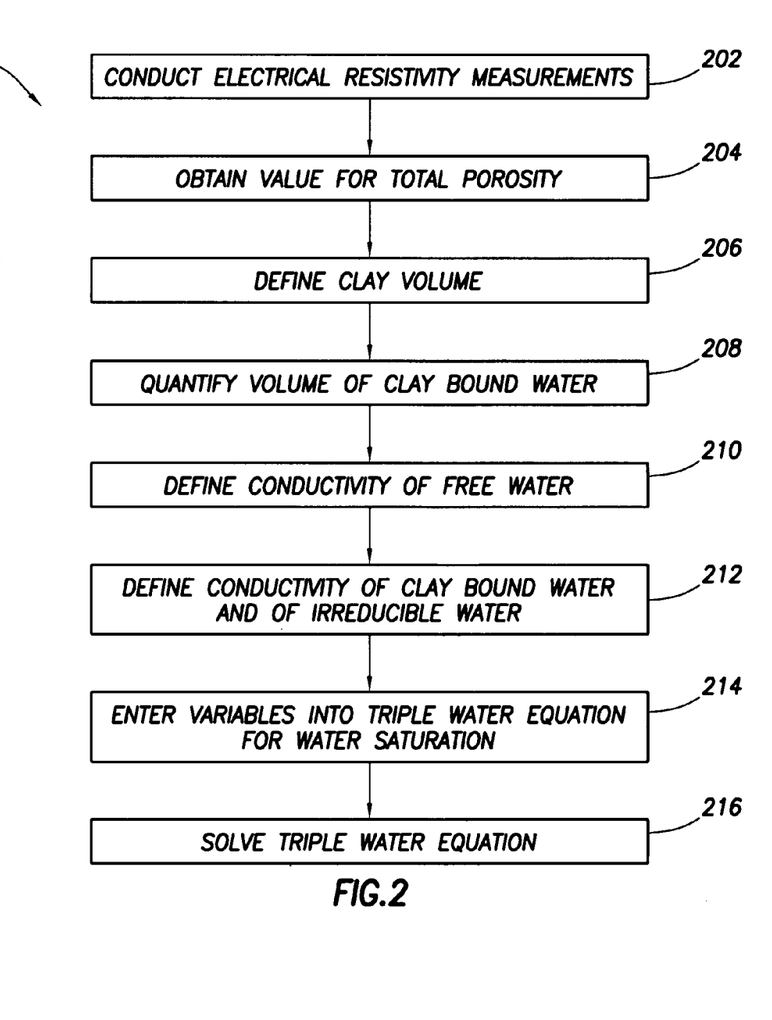
FIG. 2 is a simplified flow chart illustrating a method of evaluating water saturation in the reservoir, according to the present invention.

Referring to the simplified flow chart of FIG. 2, a method is presented for evaluating the water saturation characteristics of a reservoir, and more particularly, a reference region or section of the reservoir. The method is, of course, well suited for use in respect to a shaly-sand formation into which an injection fluid has been introduced. It should first be noted, however, that the method of FIG. 2 is presented for exemplary purposes only and to highlight a preferred embodiment according to the invention. The below-described method should not therefore, be construed to limit the invention to its specific steps and objects.

The preferred method may be initiated by conducting electromagnetic tomography measurements (202), such as electrical resistivity measurements, in the formation in question. Suitable measurements are well known in the art and may be transformed onto one of several types of resistivity logs. Similarly, various measurements provided are conducted for a parameter that is indicative of resistivity. From a value of resistivity, the conductivity of the formation is obtained. For purposes of solving the triple water equation, the value for deep conductivity, cudc, is obtained. This conductivity value may also be referred to as total measured conductivity and is inversely related to true resistivity, $R_t$ ($R_t$=1/cudc). A value for deep conductivity is obtained from a measurement conducted several feet (e.g., greater than about 90") into the formation (from the borehole) and is generally considered indicative of the undisturbed formation. A number of electrical resistivity measurement tools or devices are known and are suitable for use with the inventive method.

Figure 3:
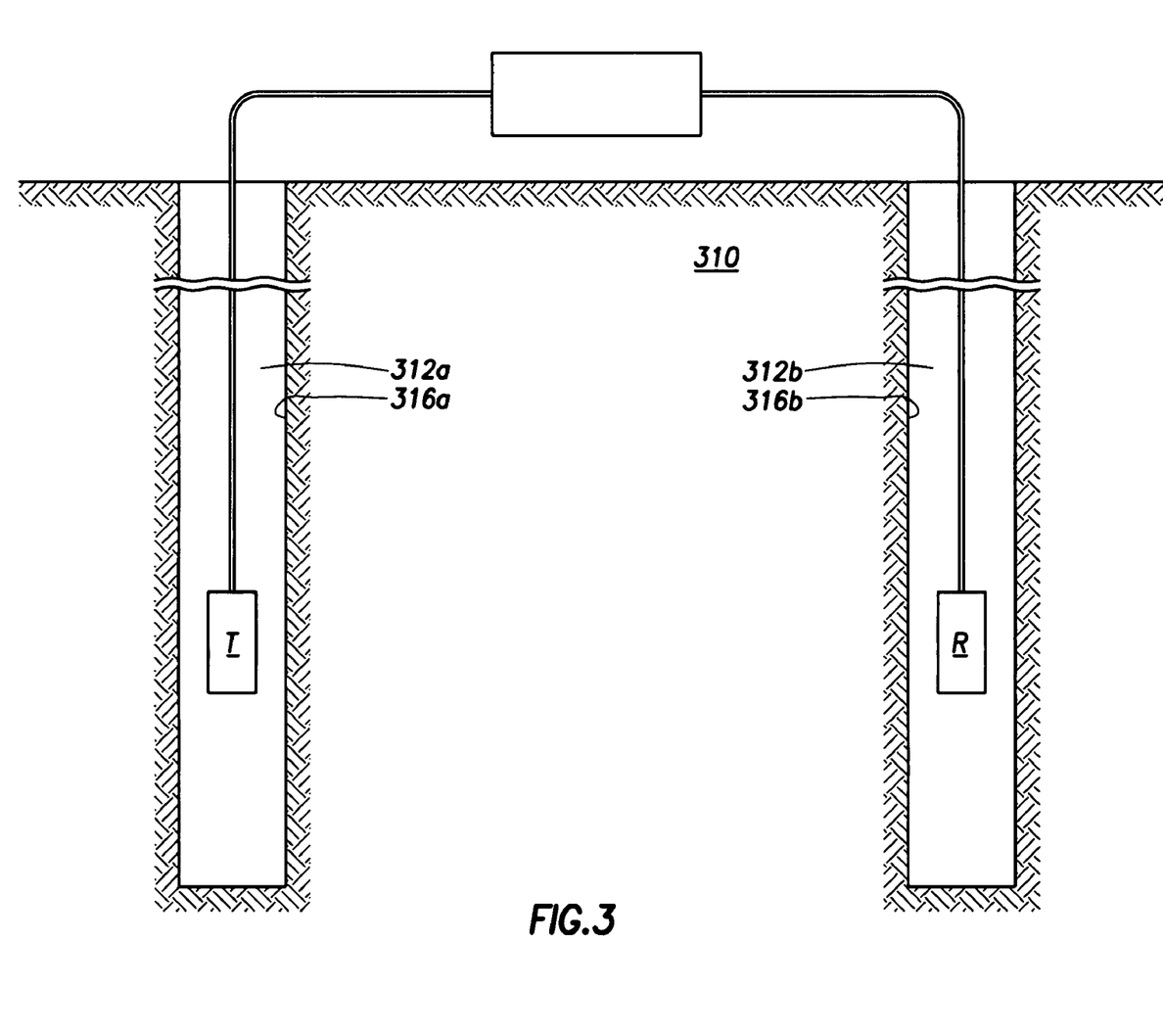
FIG. 3 is a simplified schematic of an exemplary electromagnetic tomography system suitable for use with the present invention and a reservoir.

It will also become apparent to one skilled in the relevant petrophysical, engineering, or other relevant art, upon a reading and/or viewing of the present disclosure, that the inventive method is particularly suited for use with crosswell electromagnetic measurements. Accordingly, electrical resistivity measurements obtained from crosswell electromagnetic induction surveys may be readily available and well suited for one with the evaluation method. FIG. 3 illustrates in simplified form an arrangement of a crosswell electromagnetic tomography system useable with the evaluation method according to the invention.

The next step 204 requires obtaining porosity values for the formation. Total porosity (phit) is defined as total pore space or volume occupied by fluids, (water, oil or gas) in a rock. This pore space includes any hydrocarbon fluid, mobile water, capillary bound or irreducible water and clay-bound water. As is generally known in the art, porosity values may be obtained from porosity logs, resistivity logs, or through core analysis.

Porosity measurements may be obtained through use, for example, of a density logging tool, an NMR tool, an acoustic logging device, and/or a neutron logging tool. Porosity values may also be obtained from sonic logs, neutron logs, resonance logs, and combination neutron-density logs. It will be apparent to one skilled in the relevant petrophysical or other relevant art, upon reading the Description and/or viewing the Figures provide herein, how to incorporate or utilize known resources for obtaining porosity information for purposes of the inventive evaluation method.

In one suitable method, the required porosity values are obtained from the density log and then corrected for lithology (using grain density) and fluid density (using invaded zone resistivity or neutron logs). For completeness, the formula for porosity, $f_T$, recommended is:

$$f_T = (r_{ma} - r)/(r_{ma} - (r_{hc} \cdot (1 - S_{xo}) + r_{mf} \cdot S_{xo})) \quad (6)$$

where $r_{ma}$ is the grain density (normally determined from laboratory measurements on core material), r is the density log measurement, $r_{hc}$ is the in-situ hydrocarbon density (from pressure data or sampling), $r_{mf}$ is the mud filtrate density (from correlation charts normally) and $S_{xo}$ is the invaded zone water saturation. Solving this equation requires iteration, because $S_{xo}$ is dependent on $f_T$, no matter which saturation model is used (Archie, Dual-Water, etc.).

In a further step 206 of the inventive method, measurements are conducted to define the clay volume, $V_{cl}$. In one embodiment of the invention, measurements are first made to obtain gamma ray ($G_r$), spectra ray ($S_p$), and fractional dry weights. Such measurements are obtained, for example, through use of a tool from Schlumberger referred to as Elemental Capture Spectroscopy (ECS). A combination of these measurements yields the value of clay volume $V_{cl}$ required for the present evaluation method. From the clay volume, $V_{cl}$, the volume of clay bound water, or $V_{wb}$ is then quantified (208).

In subsequent steps 210, 212, conductivity values are obtained for the water sources. First, the conductivity of formation water, $C_{wf}$ (210) is obtained. In the post-injection state of the reservoir, the conductivity $C_{wf}$ of the injection water may be obtained by direct measurements of the injection fluid. Then, estimations or field measurements of the formation water from production may be employed to define the conductivity of irreducible water, $C_{wi}$, as well as the original formation water, $C_{wf}$. Furthermore, the conductivity of clay bound water, $C_{bw}$ is determined based on the type of clay in the formation and the clay volume, $V_{cl}$.

The values defined and obtained in the above steps (202, 204, 206, 210, 212) provide the variables required to solve the triple water equation. Using traditional computer processing means, these variables are entered into the equation (214) and then, the value of water saturation $S_w$ is solved (216).

Exemplary Application of Triple Water Model

In an exemplary application of the inventive evaluation method, the triple water equation is employed to measure changes in conductivity arising from the introduction of a third conductive fluid into a reservoir. Resistivity data collected between wells as in crosswell operations, allow operators to monitor the progress of EOR injection programs. As the injected fluid moves away from an injection well, the new conductive fluid changes the overall resistivity of the region. Such changes can be interpreted, or converted into changes in water saturation, thus providing a means of monitoring the movement of the fluids in the region. This also allows for the tracking of recoverable oil that moves over time and the water, gas or steam injected into the region. The present inventive method of evaluating water saturation characteristics is well suited for monitoring such changes in oil/water content. This process may be referred to as differential saturation monitoring and is preferably performed utilizing the triple water model to solve for one set of water saturation levels.

FIG. 3 is a general depiction of a system typically employed to conduct resistivity measurements in a formation 310. The arrangement illustrates a crosswell electromagnetic system that utilizes a first borehole 312a and a second borehole 312b to measure resistivities in the formation 310 between the boreholes 312a, 312b. The boreholes 312a, 312b are lined by a casing 316a, 316b. A transmitter, T, is located within the first casing 316a and is operable to transmit into the formation and generate a signal for receipt by a receiver, R, placed across the formation 310. The receiver, R, is disposed within the casing 316b of the second borehole. Typically, the transmitter, T, will include a coil wrapped around a magnetically permeable core and a capacitor. The receiver, R, will typically include one or more antennas. The electromagnetic tomography system of FIG. 3 is provided to illustrate a system suitable for performing certain steps of the inventive method. FIG. 3 also illustrates an exemplary formation 310 to which the evaluation method of the invention may be applied, as further discussed below.

Figure 4:
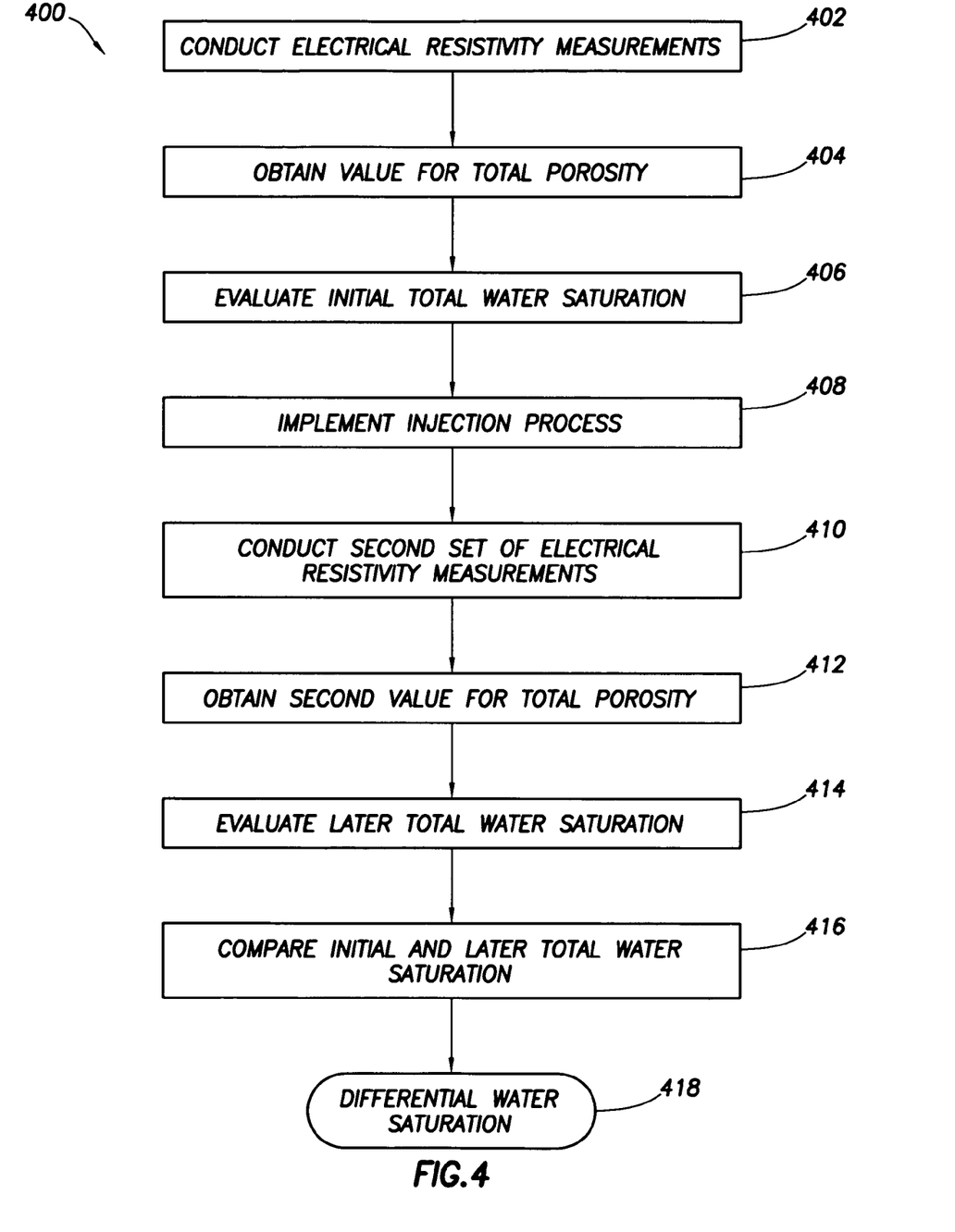
FIG. 4 is a simplified flow chart of a method of evaluating differential saturation in the reservoir, according to the present invention.

FIG. 4 is a simplified flow chart illustrating the basic steps of a method of evaluating differential water saturation levels in a shaly-sand formation, such as the formation 310 in FIG. 3. According to one embodiment of the invention, the method evaluates differential water saturation levels, over time (i.e., differential saturation monitoring) in the reservoir within the formation 310. At least two separate evaluations are performed in time: (1) evaluations at an initial state of production; and (2) evaluations at a later state of production existing after an external fluid injection process has been implemented. The injection process may, for example, be an enhanced oil recovery process or a drilling process, wherein new fluid is introduced into a reference region of the reservoir.

In an initial step of the method, electrical resistivity measurements are conducted at the reference region in the reservoir during the initial state (402) (utilizing, for example the electromagnetic tomography systems in FIG. 3). As discussed previously, in respect to the flow chart of FIG. 2, the resistivity measurements may be obtained in a number of ways generally known in the art. A value of total porosity is also obtained for the reference region of the formation (404). Again, methods of obtaining the required total porosity values are generally known in the art, and were discussed above with respect to the flowchart of FIG. 2. With these values, the initial total water saturation in the reference region may be evaluated using the Dual Water Model and similar models (406). These models are appropriate because the reference region is, for practical purposes, undisturbed by externally originating fluids. This evaluation is derived from the electrical resistivity measurement, as well as the values of total porosity.

After the above evaluation (406), the production or injection process, is implemented (408). This process entails the introduction of fluids into the reservoir in the vicinity of and into the reference region. Completion of the injection process (406) marks the beginning of the later state of the reservoir. During this later state, a second set of electrical resistivity measurements is conducted at the reference region (410). These measurements may be performed in the same manner as the measurements performed during the initial state (see e.g., step 402). Furthermore, a second set of total porosity values are obtained for the same reference region (412). The values of total porosity are typically changed by the injection process.

Given the values of resistivity (or more specifically, deep conductivity, cudc) and porosity, a second evaluation of total water saturation is made for the reference region (414). In this evaluation step 414, a value for water saturation is obtained from a relationship that accounts separately for irreducible water, mobile water, and clay bound water. More specifically, the mobile water (i.e., altered by the injection fluids) is considered to have different conductive properties from the irreducible water, and as such, is treated as a different conductive volume. As previously discussed, the preferred relationship employed in this step is provided by the triple water equation.

The method then employs the preferred step 416 of comparing the total water saturation levels at the reference region during the later state with the initial total water saturation. In this way, the differential water saturation is evaluated for the reference region over time (between the initial state and the later state). It is preferred that evaluation of differential water saturation levels are determined at a plurality of reference regions in the reservoir, and more preferably, continuously along the vertical and horizontal directions of the reservoir.

Figure 5:
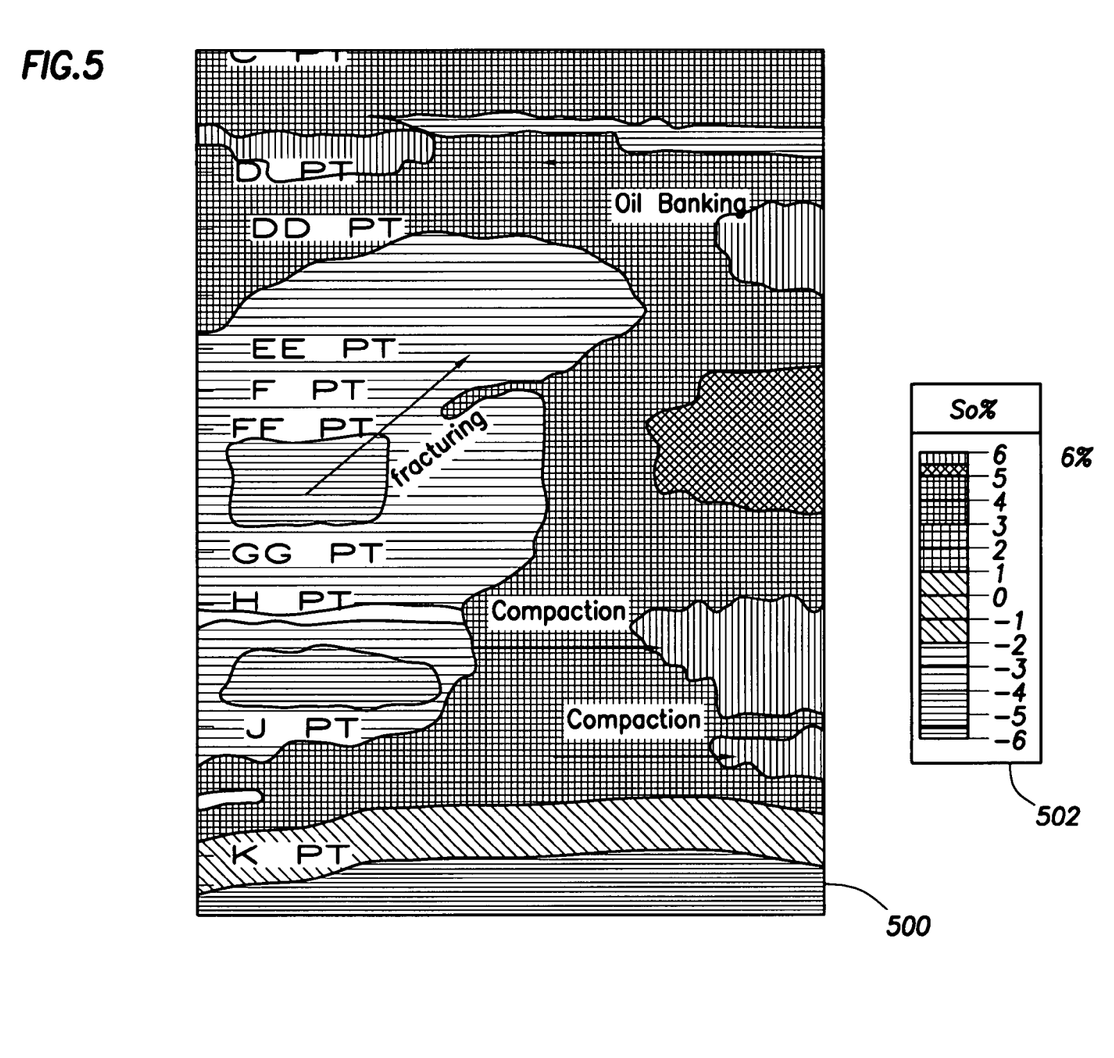
FIG. 5 is a two-dimensional map of differential saturation in a reservoir.

FIG. 5 provides a differential saturation map 500 of a reservoir having the aforementioned reference regions. The map of FIG. 5 is a product of the method of evaluating differential water saturation levels described above and represented by the flowchart of FIG. 4.

The map 500 of FIG. 5 is a two dimensional map of a reservoir representing differential saturation levels through-out by way of color indications. The map 500 itself, is an illustration of the result of one application of the inventive method. The alphabetical markers (e.g., DPT, DD PT, et al.) along the left edge indicate different depths or laminations in the reservoir. Preferably, a color key 502 is provided to the right of the map 500. The color key 502 represents the different degrees of oil saturation changes between the initial state and the later state. A color spectrum for the color key 502 extends from a top indication of "red" to a bottom indication of "blue". Between these two ends are regions of "green" and "yellow". For this particular map 500, the red regions represent an increase in oil saturation, So, by about 6%, while the blue regions represent a decrease in oil saturation, So, by about 6%. As discussed above, the oil or hydrocarbon saturation levels are determined as the remaining fraction of the water saturation level. The color key 502 and the color indications therein can easily be transformed to water saturations $S_w$ instead of oil saturation $S_O$. To facilitate the description of a black and white version of the map 500 (as provided in FIG. 5), the color coding has been replaced with exaggerated shadings and the general indication and delineation of the color areas. Simple analysis of the differential saturation map 500 provides an evaluation of the effectiveness of an external injection process.

The reservoir mapped by the map 500 has undergone an EOR water flood process requiring the injection of new fluids. In this case, the presence of shale was expected and thus, the dual water model (or similar models derived from the Archie equation) is employed to evaluate the fluid saturation level sometime in the year zero (initial state). Because the water flood process necessitates the introduction of injection fluids in the reservoir, the triple water model is employed to calculate fluid saturation at year 4 (later state). Differential saturation is obtained by comparing the water saturation and oil saturation levels at a reference region between year zero (initial state) to year 4 (later state). The percent change in oil or water saturation is then indicated by color code on the differential saturation map. In respect to the subject reservoir, pre- and post-injection evaluations have been made continuously throughout the vertical and horizontal expanse of the mapped reservoir.

The map 500 in FIG. 5 provides the changes in saturation levels at various layers of the reservoir. These differential values define the spatial distribution and fluid movement in the reference region, which may have been a result of production mechanisms. In this way, the effectiveness of an injection process, such as a water flood process, implemented in a reference region is evaluated.

For example, three types of general observations may be made of the reservoir mapped by the map 500. First, the map 500 reveals evidence of oil banking above the D marker, in a direction from right to left. This evidence is provided by "red" areas corresponding to increase saturation ($S_O$) levels on the left side and, immediately to the left of "blue" areas indicating decreased saturation levels. This suggests that an injection process applied near the "blue areas" has effectively pushed oil levels from right to left, and concentrated the oil in the "red" region of the reservoir. Furthermore, increasing saturation levels below J PT marker suggests that the porosity in this region may be compacting. This evaluation is derived from pre-flood information indicating that all mobile pore spaces in this region were filled with hydrocarbons. To the well operator, this means that the saturation levels in the region cannot be increased any further. The map 500 also indicates decreasing saturation levels between markers EE and J (as indicated by the "blue" to "green" levels). In this case, water injection has only been implemented below the FF level; so this suggests a fracturing trend upwards and from left to right of the injection area.

Derivation of the Triple Water Model

The following discussion provides a derivation of the Triple Water Equation from the generally accepted Archie Equation. Such a derivation lends support to the validity of the Triple Water Equation. It should also facilitate understanding of the model by one skilled in the relevant art.

The general expression for the conductivity of a mixture of fluids is:

$$cw_a = \frac{\Sigma v_j cw_j}{\Sigma v_j} \quad j:1 \text{ to } n \qquad (7)$$

where $v_t$ is the sum from j equals 1 to n of $v_j$, $v_j$ being the fractional volume component of the total liquid volume $v_t$; $cw_j$ is the conductivity of the jth liquid component, typically measured in milliohms; and $cw_a$ is the conductivity of the overall liquid. For the dual water model, n equals 2, which gives:

$$cwa=(vwf \cdot cwf+vwb \cdot cbw)/(vwf+vwb) \qquad (8)$$

where vwf is volume of free water, vwb is volume of clay bound water, cwf is conductivity of free water and cbw is conductivity of bound water. Because it is convenient to express volumes in terms of saturation and saturation is a fraction of the total pore space or porosity that contains oil and water, conductivity can be expressed as follows:

$$cwa = [(swt-swb)cwf + (swb \cdot cbw)]/[(swt-swb)+swb] \qquad (9)$$
$$= [(swt-swb) \cdot cwf + (swb) \cdot (cbw)]/swt$$
$$= cwf + (swb \cdot (cbw-cwf))/swt$$

For a system with three liquids, i.e., a triple water problem, the corresponding equation is:

$$cwa = [(vwf \cdot cwf) + (vwi \cdot cwi) + (vwb \cdot cbw)]/(vwf + vwi + vwb) \qquad (10)$$
$$= [(swt-swi-swb) \cdot cwf + (swi \cdot cwi) + (swb \cdot cbw)]/swt$$

where swi=(vwf+vwb)/phit and cwi is the conductivity of irreducible water.

Using the Module capability of Mathematica (provided by Wolfram Research Company of Champaign, Ill., USA), forward and inverse models (derivations of the triple water equation) may be generated to confirm total measured conductivity and the conductivity of the fluid mixture respectively. The forward model may be expressed as:

$$CUDC=CWA \cdot SWT^{ndwa} \cdot PHIT^{ndwa} \qquad (11)$$

wherein,
CUDC=total measured conductivity from logs or from Crosswell Tomographic results
Cwa=apparent water conductivity,
Swt=total water saturation,
ndwa and mdwa=constants, and
PHIT=total porosity.

The forward model is defined as a linear combination of terms that includes volume fractions of fluids expressed as saturations. For present purposes, the terms "mdwa" and "ndwa" are equivalent to "n" and "m" in the Archie equation. The term CUDC is equivalent to Rt as Rt is identically equal to 1/CUDC or 1/Ct (one over total conductivity).

$$1/Rt=(1/Rwa) \cdot (sw^n \cdot phit^m) \qquad (12)$$

or $$sw^n=Rwa/(Rt \cdot phit^m) \text{ which is the Archie equation.} \qquad (13)$$

One difference between the triple water equation and the Archie equation is that the Archie equation uses "rw=1/cw" for water conductivity or water resisitivity, whereas the triple water equation uses "Cwa" or apparent water conductivity expressed as a volume weighted sum of all the conductive fluids to be measured (i.e., the conductive waters in the reservoir).

The Inverse model provides a method of solving the forward model in terms of Cwa. By plugging Cwa into the Archie equation (and depending on the definition of Cwa), the dual water equation or the triple water equation is attained.

Using Mathematica Module Expressions to Confirm Derivation Forward Model Expressions One can define a function cudcDwa that computes deep conductivity as a function of porosity, cementation exponent, saturation exponent, free water conductivity, bound water conductivity, total water saturation, and bound water saturation. The function is provided by the following Mathematica expression:

$$(*cudcDwa[phit\_, mDwa\_, n\_, cwf\_, cwi\_, swt\_, swb\_, swi\_] := \qquad (14)$$
$$\text{Module}[\{cwa, cudc\},$$
$$cwa = cwf + (swi(cwi-cwf)) + (cbw-cwi)swb/swt;$$
$$cudc = swa\,swt^n\,phit^{mDwa}]*)$$

$$(*cudcDwa[phit\_,mDwa\_,n\_,cwf\_,cwi\_,swt\_,swb\_,swi\_]:= \qquad (15)$$
$$\text{Module}[\{cwa,cudc\},cwa=((swt-swi-swb)cwf+$$
$$swi\,cwi+swb\,cbw/swt;cudc=cwa\,swt^n\,phit^{mDwa}]$$

The function may be run with a saturation exponent of 2:

$$cudcDwa \cdot [phit, mDwa, 2, cwf, cwi, cbw, swt, swb, swi] \qquad (16)$$

$$phit^{mDwa} \cdot swt \cdot (cbw\,swb+cwi\,swi+cwf(-swb-swi+swt)) \qquad (17)$$

When swi is zero, the above equation reduces to the dual water equation:

$$cudcDwa \cdot [phit, mDwa, 2, cwf, cwi, cbw, swt, swb, 0] \qquad (18)$$

$$phit^{mDwa} \cdot swt \cdot (cbw\,swb+cwf(-swb+swt)) \qquad (19)$$

Inverse Model

Having determined the forward model for the case where the saturation exponent is 2, Mathematica may be used to solve the function for swt (which is the purpose of the exercise):

$$soll = Solve[cudc == phit\,mDwa \cdot swt2 \qquad (20)$$
$$((swt-swi-swb)cwf + swi\,cwi + swb\,cbw)/swt, swt]$$

-continued $$\{\{swt \to (1/2\, cwf)(-cbw\, swb + cwf\, swb + \qquad (21)$$
$$cwf\, swi - cwi\, swi - phit^{-mDwa}\sqrt{(4\, cudc\, cwf\, phit^{mDwa}} +$$
$$(-cbw\, phit^{mDwa} swb + cwf\, phit^{mDwa} swb +$$
$$cwf\, phit^{mDwa} swi - cwi\, phit^{mDwa} swi)^2))\},$$

$$\{swt \to (1/2\, cwf)(-cbw\, swb + cwf\, swb + cwf\, swi - \qquad (22)$$
$$cwi\, swi - phit^{-mDwa}\sqrt{(4\, cudc\, cwf\, phit^{mDwa}} +$$
$$(-cbw\, phit^{mDwa} swb + cwf\, phit^{mDwa} swb +$$
$$cwf\, phit^{mDwa} swi - cwi\, phit^{mDwa} swi)^2))\}\}$$

It is clear that the second solution is the correct one, because it does not have an imaginary result. The variable sol1 can be assigned to the solution which is a list. In order to extract the second solution, one must use $$sol1[[2, 1, 2]] \qquad (23)$$

$$(1/2\, cwf)(-cbw\, swb + cwf\, swb + cwf\, swi - cwi\, swi + \qquad (24)$$
$$phit^{-mDwa}\sqrt{(4cudc\, cwf\, phit^{mDwa}} + (-cbw\, phit^{mDwa} swb +$$
$$cwf\, phit^{mDwa} swb + cwf\, phit^{mDwa} swi - cwi\, phit^{mDwa} swi)^2))$$

For evaluation, this may be written as, $$sola = [(swb(swf - cbw) + swi \cdot (cwf - cwi)/2\, cwf] + \qquad (25)$$
$$(\sqrt{(4cudc\, cwf\, phit^{mDwa}} +$$
$$((swb(cwf - cbw) + swi \cdot (cwf - cwi))phit^{mDwa})^2))/$$
$$(2\, cwf\, phit^{mDwa})$$

$$\frac{(-cbw + cwf)swb + (cwf - cwi)swi}{2cwf} + \qquad (26)$$
$$\frac{phit^{-mDwa}\sqrt{\dfrac{4\, cudc\, cwf\, phit^{mDwa} + phit^{2mDwa}}{((-cbw + cwf)swb + (cwf - cwi)swi)^2}}}{2\, cwf}$$

To verify that no mistakes have been made in writing sola, one may evaluate the difference between sol1 and sola:

Simplify [sol1−sola] (27)

It is zero, so sola and sol1 are equivalent

Numerical Test

The accuracy of the above expressions may be checked using a sample depth level data set. The object of the exercise is to check whether the answers from sola and sol1 are the same. This is done using the "/" operator:

sol1/.{cudc→1.5, phit→0.27, mDwa→1.9, swb→0.2, swi→0.1, cwi→40, cwf→25, cbw→32}0.793705 (28)

sola provides the same answer:

sola/.{cudc→1.5, phit→0.27, mDwa→1.9, swb→0.2, swi→0.1, cwi→40, cwf→25, cbw→32}0.793705 (29)

Now, a function can be created in which the water saturation is a function of cudc for this particular problem:

swtCudc[cudc_]:=sola/.{phit→0.27, mDwa→1.9, swb→0.2,→swi→0.1, cwi→40, cwf→40, cbw→32} swtCudc[cudc]0.02+0.150425
√0.0176776+13.2957cudc (30)

While specific embodiments of the invention have been described and illustrated, it will be clear that variations in the details of the embodiments specifically illustrated and described may be made without departing from the true spirit and scope of the invention as defined in the appended claims and equivalents thereof. For example, the methods utilizing the triple water model may be used to evaluate different conditions in a reservoir other than water flood processes.

What is claimed is:

1. A method of evaluating water saturation characteristics in a geological formation penetrated by a borehole and including injection fluid introduced into the formation by an external injection process performed upon the formation, said method comprising the steps of:
    conducting electromagnetic induction measurements of the formation in the vicinity of the borehole, the measurements being indicative of resistivity values of the formation;
    obtaining a value of total porosity for the formation;
    defining fractional volumes for each of clay bound water, free water, and irreducible water in the formation, wherein the free water volume accounts for injection fluid introduced into the formation;
    defining values of conductivity for each of the clay bound water, the free water, and the irreducible water in the formation;
    determining total water saturation in the formation from a relationship between values of total porosity and conductivity of the formation, and values of conductivity and fractional volume for each of clay bound water, free water, and irreducible water; and
    basing a drilling decision on the determined total water saturation.

2. The method of claim 1, wherein the formation is a shaly formation, said step of defining values of conductivity including obtaining a conductivity value for free water from measurements of the conductivity of the injection fluid.

3. The method of claim 2, wherein the total water saturation is obtained from the relationship provided by a Triple Water Equation.

4. A method of evaluating differential saturation levels in a reservoir from an initial state of production to a later state of production existing after performance of an external fluid injection process whereby new injection fluid is introduced into a reference region of the reservoir, said method comprising the steps of:
    conducting electrical resistivity measurements at a reference region in the reservoir during the initial state; and
    deriving from the electrical resistivity measurements, an evaluation of initial total water saturation at the reference region;
    performing a fluid injection process on the reservoir, whereby injection fluid is introduced into the reference region of the reservoir;
    conducting a second set of electrical resistivity measurements at the reference region during the later state;
    deriving from the second electrical resistivity measurements, an evaluation of later total water saturation at the reference region, whereby total water saturation is obtained from a relationship accounting for fractional volumes of each of irreducible water, free water, and clay-bound water, wherein the free water is considered to have different conductive properties from the irreducible water and the clay bound water;
    comparing the later total water saturation with the initial total water saturation, thereby evaluating the differential water saturation at the reference region between the initial state and the later state; and outputting the differential water saturation for the reservoir.

5. The method of claim 4, wherein said conducting, deriving, and comparing steps are applied to a series of reference regions, said comparing step being conducted to compare differential saturation levels across a span of the reservoir, thereby monitoring the movement of fluids across said reference regions.

6. The method of claim 5, wherein said reference regions vary horizontally and vertically, said method further comprising visually representing differential saturation levels on a map of the reservoir.

7. The method of claim 4, wherein each of said deriving steps combines values of formation resistivity and total porosity to obtain a value for total water saturation.

8. The method of claim 7, wherein said comparing step includes correlating an increase in differential water saturation at the reference region to an increase in hydrocarbon saturation and a decrease in differential water saturation to an increase in hydrocarbon saturation.

9. The method of claim 7, further comprising the steps of:
obtaining a value of total porosity for the formation during the initial state;
obtaining a value of total porosity for the formation during the later state; and
defining fractional volumes for each of the clay bound water, the free water, and the irreducible water during the later state; and
wherein the conductivity of the free water is obtained, during the later state, from a measurement of the conductivity of the injection fluid.

10. The method of claim 9, wherein said step of deriving an evaluation of water saturation, during the later state, includes employing a Triple Water Equation.

11. The method of claim 10, wherein said step of employing a Triple Water Equation, includes entering values of deep conductivity for the formation, total porosity, and conductivity for each of the clay bound water, the free water, and the irreducible water.

12. The method of claim 10, wherein said step of deriving an evaluation of initial water saturation includes employing a Dual Water Model.

13. The method of claim 10, wherein said performing step includes performing an enhanced oil recovery process.

14. A method of interpreting electromagnetic tomography measurements conducted in a geological formation penetrated by a borehole and including fluids introduced into a reference region of the formation by an external injection process performed upon the formation, to obtain water and hydrocarbon saturation characteristics of the reference region in the formation, said method comprising the steps of:
conducting electromagnetic tomography measurements of the formation in the vicinity of the borehole, the measurements being indicative of resistivity values of the reference region of the formation;
obtaining a value of total porosity for the reference region of the formation;
defining values of conductivity for each of clay bound water, free water, and irreducible water in the reference region of the formation;
defining fractional volumes for each of the clay bound water, the free water, and the irreducible water in the reference region of the formation;
determining total water saturation in the reference region of the formation, including employing a triple water model to obtain a value for total water saturation, whereby the total water saturation value is obtained from a relationship in which values are entered for total porosity, conductivity of the formation, conductivity of clay bound water, conductivity of free water, and conductivity of irreducible water; and
outputting a saturation map of the total water saturation in the formation.

15. The method of claim 14, wherein said step of determining total water saturation includes employing the following triple water equation under the triple water model:

$$S_w = [S_{wb}(C_{wf} - C_{bw}) + S_{wi}(C_{wf} - C_{wi})]/2C_{wf} + \sqrt{4(C_{udc})(C_{wf})(phit^{mDwa}) + ((S_{wb}(C_{wf} - C_{bw}) + S_{wi}(C_{wf} - C_{wi}))(phit^{mDwa}))^2} / 2(C_{wf})(phit^{mDwa})$$

wherein
$S_{wb}$=fractional portion of total porosity saturated with clay bound water,
$C_{wf}$=conductivity of freely moving water,
$C_{bw}$=conductivity of clay bound water,
$C_{udc}$=deep conductivity,
phit=total porosity, and
$mD_{wa}$=cementation exponent.

16. The method of claim 14, wherein said step of defining fractional volumes includes conducting measurements to obtain gamma ray, spectra ray, and fractional dry weights to define clay volume and obtaining therefrom, a fractional volume of clay bound water.

17. The method of claim 14, wherein said conducting step includes conducting electrical resistivity measurements, said method further comprising developing resistivity well logs from the resistivity measurements.

18. The method of claim 14, wherein the reference region is a zone unaffected by the invasion of drilling fluids, said method further comprising the step of obtaining a value for deep conductivity of the formation, $C_{udc}$, from the tomography measurements and entering the deep conductivity value in the triple water model relationship.

19. The method of claim 14, wherein said step of conducting tomography measurements is conducted more than about 90 inches from the borehole, the reference region being located more than about 90 inches from the borehole.

20. The method of claim 14, wherein said step of defining a value of conductivity for free water includes deriving the conductivity of free water from conductivity measurements of the injection fluid.

21. A method of evaluating water saturation in a shaly-sand formation after an injection process, said method comprising the steps of:
obtaining a value of deep conductivity, $C_{udc}$, of the formation;
obtaining a value of total porosity, phit, for the formation;
obtaining values of conductivity of each of clay bound water, $C_{bw}$, free water, $C_{wf}$, introduced into the formation upon implementation of the injection process, and irreducible water, $C_{wi}$;
determining a fractional portion $S_{wb}$ of total porosity, phit, saturated with clay bound water and a fractional portion saturated with irreducible water $S_{wi}$;

entering values of $S_{wb}$, $S_{wf}$, $C_{wl}$, $C_{bw}$, $C_{wl}$, $C_{udc}$, and phit into a triple water equation to solve for total water saturation, $S_w$, wherein the triple water equation is expressed as follows:

$$S_w = [S_{wb}(C_{wf} - C_{bw}) + S_{wi}(C_{wf} - C_{wi})]/2C_{wf} + \sqrt{4(C_{udc})(C_{wf})(phit^{mDwa}) + ((S_{wb}(C_{wf} - C_{bw}) + S_{wi}(C_{wf} - C_{wi}))(phit^{mDwa}))^2} \Big/ 2(C_{wf})(phit^{mDwa})$$

wherein $mD_{wa}$ is a known empirically derived cementation exponent;

outputting the total water saturation for the reservoir; and
basing a drilling decision on the determined total water saturation.

22. The method of claim 21, wherein said step of obtaining a value for deep conductivity, $C_{udc}$, is preceded by the step of conducting electrical resistivity measurements in the formation.

23. The method of claim 22, wherein said step of obtaining porosity values includes obtaining the value from a porosity log.

24. The method of claim 23, wherein said step of entering values includes employing a computer processing means to solve the triple water equation for total water saturation, $S_w$.

* * * * *